United States Patent
Suitou et al.

[11] Patent Number: 6,146,106
[45] Date of Patent: Nov. 14, 2000

[54] ELECTROMAGNETIC VALVE

[75] Inventors: Ken Suitou; Masahiro Kawaguchi; Atsuyuki Morishita; Takuya Okuno; Masakazu Murase, all of Kariya; Norio Uemura; Kazuaki Nagayoshi, both of Fujisawa; Ichiro Hirata, Sagamihara; Kouji Watanabe, Kamakura, all of Japan

[73] Assignee: Kabushiki Kaisha Toyoda Jidoshokki Seisakusho, Kariya, Japan

[21] Appl. No.: 09/078,236

[22] Filed: May 13, 1998

[30] Foreign Application Priority Data

May 14, 1997 [JP] Japan .................................. 9-124517

[51] Int. Cl.$^7$ ...................................................... F04B 1/26
[52] U.S. Cl. ................. 417/222.2; 251/61.5; 251/129.18
[58] Field of Search ..................... 417/222.2; 251/129.02, 251/129.15, 129.18, 61.5

[56] References Cited

U.S. PATENT DOCUMENTS

| 5,145,326 | 9/1992 | Kimura et al. . | |
| 5,531,572 | 7/1996 | Kimura et al. ........................ | 417/222.2 |
| 5,842,835 | 12/1998 | Kawaguchi et al. .................. | 417/222.2 |
| 5,890,876 | 4/1999 | Suito et al. .............................. | 417/213 |
| 5,964,578 | 10/1999 | Suito et al. ........................... | 417/222.2 |

FOREIGN PATENT DOCUMENTS

| 0 628 722 A1 | 12/1994 | European Pat. Off. . |
| 3-23385 | 1/1991 | Japan . |
| 6-26454 | 2/1994 | Japan . |
| 6-346845 | 12/1994 | Japan . |

*Primary Examiner*—Charles G. Freay
*Attorney, Agent, or Firm*—Morgan & Finnegan, L.L.P.

[57] ABSTRACT

A control valve used in a variable displacement compressor. The valve includes a valve chamber having a valve hole. A valve body is accommodated in the valve chamber for selectively closing and opening the valve hole. An opening spring urges the valve body in a direction opening the valve hole. An actuator generates force in a direction closing the valve hole. A solenoid rod transmits the force of the actuator to the valve body. A pressure sensing chamber is defined independently from the valve chamber to receive refrigerant from a suction passage. A pressure sensing member is located in the sensing chamber for sensing the pressure in the sensing chamber. A pressure sensing rod transmits the pressure sensed by the sensing member to the valve body. A compression spring, a cap and stoppers maintain proper alignment of the pressure sensing member. The valve body is moved based on the refrigerant pressure sensed by the sensing member, the force of the spring and on the force of the actuator.

39 Claims, 7 Drawing Sheets

ELECTROMAGNETIC VALVE

BACKGROUND OF THE INVENTION

The present invention relates to electromagnetic valves. More particularly, the present invention pertains to an electromagnetic valve that is used as a displacement control valve in fluid machinery, especially in a variable displacement compressor employed in a vehicle air conditioner.

A typical automobile has a compressor that adjusts the temperature of a passenger compartment for making the ride comfortable for passengers. Often, this is a variable displacement compressor having a swash plate. The swash plate is tiltably supported on a drive shaft of the compressor. The inclination of the swash plate is changed in accordance with the difference between the pressure in a crank chamber and the suction pressure of the compressor. Rotation of the swash plate is converted into linear reciprocation of pistons.

Such a compressor includes an electromagnetic valve for controlling the displacement of the compressor. The valve adjusts the pressure in the crank chamber and the suction pressure for controlling the refrigeration performance of the compressor. Thus, an electromagnetic valve that accurately operates is needed for making the conditions of the passenger compartment comfortable for the passengers.

Typically, the valve includes a housing and an electromagnetic actuator that are secured to each other at the center of the valve. The valve housing includes a valve chamber. The valve chamber is located midway in a refrigerant passage and accommodates a valve body for opening and closing a valve hole. The valve also has a pressure sensing chamber. A pressure sensing member is housed in the pressure sensing chamber.

One end of the valve body is coupled to the actuator by a solenoid rod. The other end of the valve body is coupled to the pressure sensing member in the pressure sensing chamber by a pressure sensing rod. The pressure sensing member expands and contracts in accordance with the pressure in the pressure sensing chamber.

The actuator includes a fixed iron core, a steel plunger and a solenoid coil. The coil located radially outward of both the fixed core and the plunger. Electric current having a certain magnitude is supplied to the coil. The current produces a magnetic attractive force between the fixed core and the plunger in accordance with the current magnitude.

The attractive force is transmitted to the valve body by the solenoid rod. Also, when the pressure sensing member expands or contracts, the valve body receives the force from the sensing member through the pressure sensing rod. The opening area between the valve body and the valve hole is determined by the equilibrium of these forces. Accordingly, the flow rate of fluid in the passage of the valve is controlled.

When the pressure in the sensing chamber is lowered, the sensing member expands and is thus firmly held between an inner wall of the sensing chamber and the sensing rod. When the pressure in the sensing chamber increases, on the other hand, the sensing member contracts, which tends to separate the sensing member from the wall of the sensing chamber. In this state, the sensing member is supported only by an end of the sensing rod, which is inserted in a connector provided on the sensing member. A minute clearance exists between the sensing rod and the inner wall of the connector. Therefore, if the valve is vibrated, the sensing member tilts with respect to the sensing rod.

If the pressure in the sensing chamber is lowered again, the sensing member expands, which moves the sensing member toward the inner wall of the sensing chamber. In either case, the sensing member may be held between the sensing rod and the inner wall of the sensing chamber in a tilted state. As a result, the force of the sensing member is not accurately transmitted to the valve body through the sensing rod. This deteriorates the control accuracy of the electromagnetic valve.

The wall of the sensing member is made of a relatively thin material. Tilting of the sensing member may cause the sensing member's periphery to contact the inner wall of the sensing chamber. In this state, repeated expansions and contractions of the sensing member will wear the contacting part, which will shorten the life of the electromagnetic valve.

SUMMARY OF THE INVENTION

Accordingly, it is an objective of the present invention to provide a control valve that maintains proper alignment of a pressure sensing member for preventing the sensing member from being worn and for allowing the sensing member to accurately operate.

To achieve the foregoing and other objectives and in accordance with the purpose of the present invention, a control valve that controls flow of fluid between a first passage and a second passage by selectively connecting and disconnecting the first passage and the second passage is provided. The valve includes a valve chamber, a valve body, a first spring, an actuator, a first rod, a sensing chamber and a pressure sensing member. The valve chamber has a valve hole connected with the first passage and the second passage. The valve body is accommodated in the valve chamber for selectively closing and opening the valve hole. The first spring urges the valve body in a direction opening the valve hole. The actuator generates force in a direction closing the valve hole. The first rod transmits the force of the actuator to the valve body. The sensing chamber is defined independently from the valve chamber to receive fluid from outside of the control valve. The pressure sensing member is located in the sensing chamber for sensing the pressure in the sensing chamber. The second rod transmits the pressure sensed by the pressure sensing member to the valve body. The valve further includes means for maintaining a predetermined orientation of the pressure sensing member. The valve body is moved based on the fluid pressure sensed by the pressure sensing member, the force of the first spring and on the force of the actuator.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A displacement control valve according to one embodiment of the present invention will be described with reference to FIGS. 1 to 5. The valve is used in a clutchless type variable displacement compressor.

First, the compressor will be described with reference to FIG. 3.

A front housing 12 is secured to the front end face of a cylinder block 11. A rear housing 13 is secured to the rear end face of the cylinder block 11 with a valve plate 14. A crank chamber 15 is defined by the inner walls of the front housing 12 and the front end face of the cylinder block 11. A drive shaft 16 is rotatably supported in the front housing 12 and the cylinder block 11 and extends through the crank chamber 15.

The front housing 12 has a cylindrical wall extending forward. The front end of the drive shaft 16 is located in the cylindrical wall and is secured to a pulley 17. The pulley 17 is rotatably supported by the cylindrical wall with an angular bearing 19. The pulley 17 is directly coupled to an external drive source, or a vehicle engine (not shown), by a belt 18. The angular bearing 19 transfers thrust and radial loads that act on the pulley 17 to the front housing 12.

A lip seal 20 is located between the drive shaft 16 and the front housing 12 for sealing the crank chamber 15. That is, the lip seal 20 prevents refrigerant gas in the crank chamber 15 from leaking outside.

A lug plate 21 is fixed to the drive shaft 16 in the crank chamber 15. A swash plate 22 is supported by the drive shaft 16 in the crank chamber 15 to slide along and to tilt with respect to the axis of the shaft 16. The swash plate 22 functions as a cam plate. A pair of guiding pins 23 are fixed to the swash plate 22. Each guiding pin 23 has a guide ball at its distal end. The lug plate 21 has a support arm 24. A pair of guide holes 25 are formed in the support arm 24. Each guide pin 23 is slidably fitted into the corresponding guide hole 25. The cooperation of the arm 24 and the guide pins 23 permits the swash plate 22 to rotate integrally with the drive shaft 16. The cooperation also guides the tilting of the swash plate 22 along the axis of the drive shaft 16.

As the center of the swash plate 22 moves toward the cylinder block 11, the inclination of the swash plate 22 decreases. A spring 26 extends between the lug plate 21 and the swash plate 22. The spring 26 urges the swash plate 22 in the direction that decreases the inclination of the swash plate 22. The lug plate 21 has a projection 21a on its rear end face. Abutment of the swash plate 22 against the projection 21a limits the maximum inclination of the swash plate 22.

Figure 3:
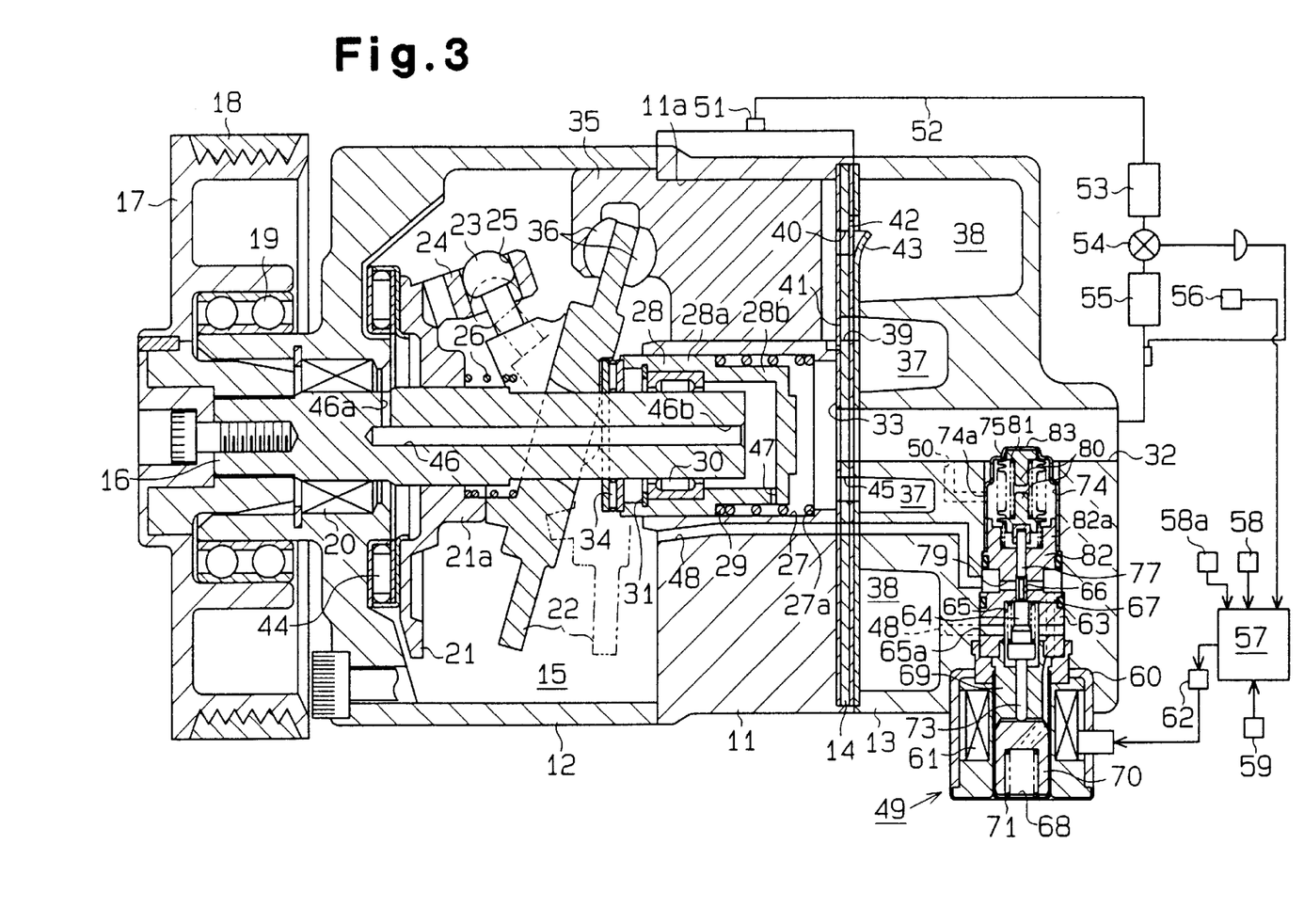
FIG. 3 is a cross-sectional view illustrating a clutchless type variable displacement compressor having the electromagnetic valve of FIG. 1.
Figure 4:
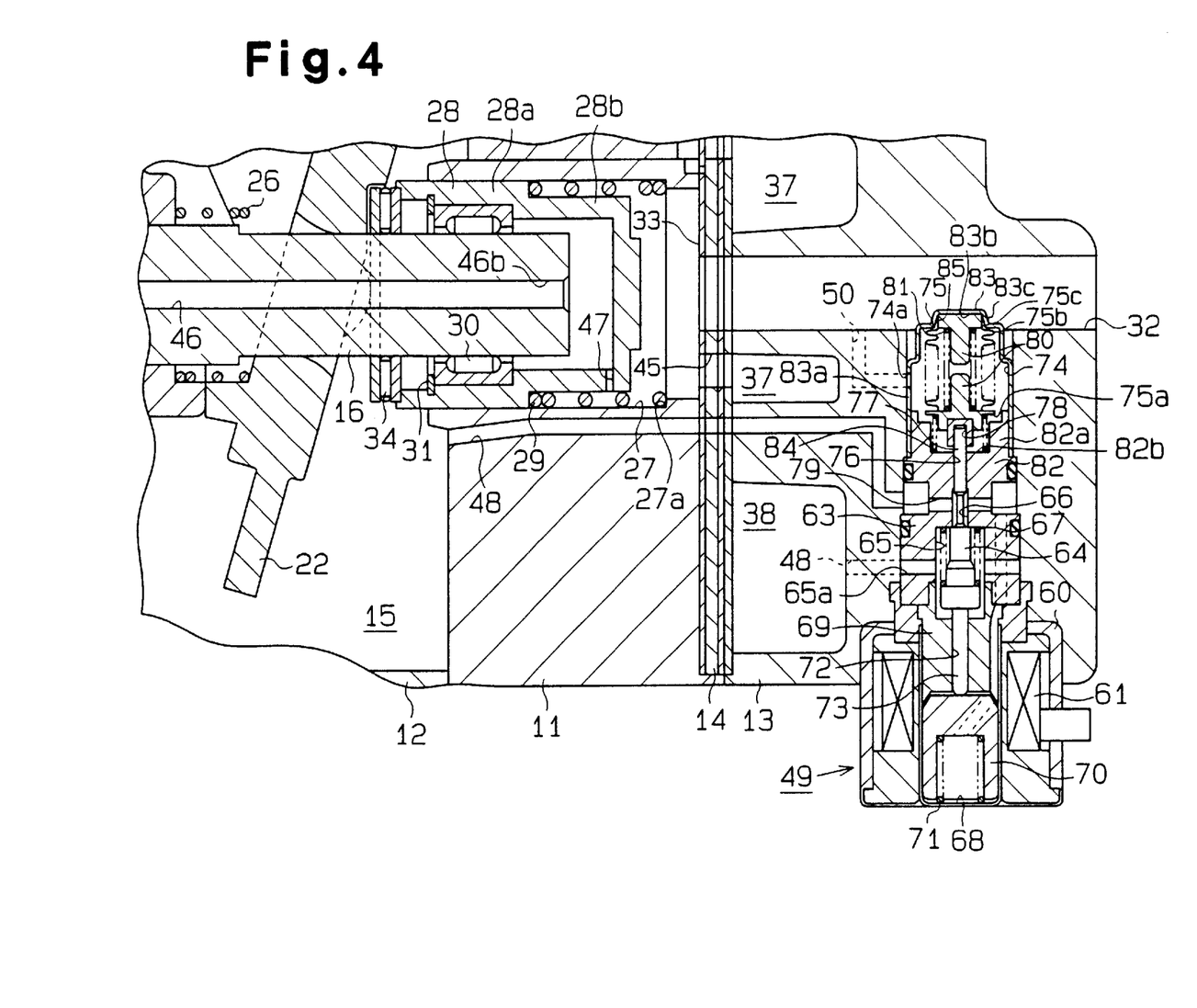
FIG. 4 is an enlarged partial cross-sectional view illustrating the compressor of FIG. 3 when the inclination of the swash plate is maximum.
Figure 5:
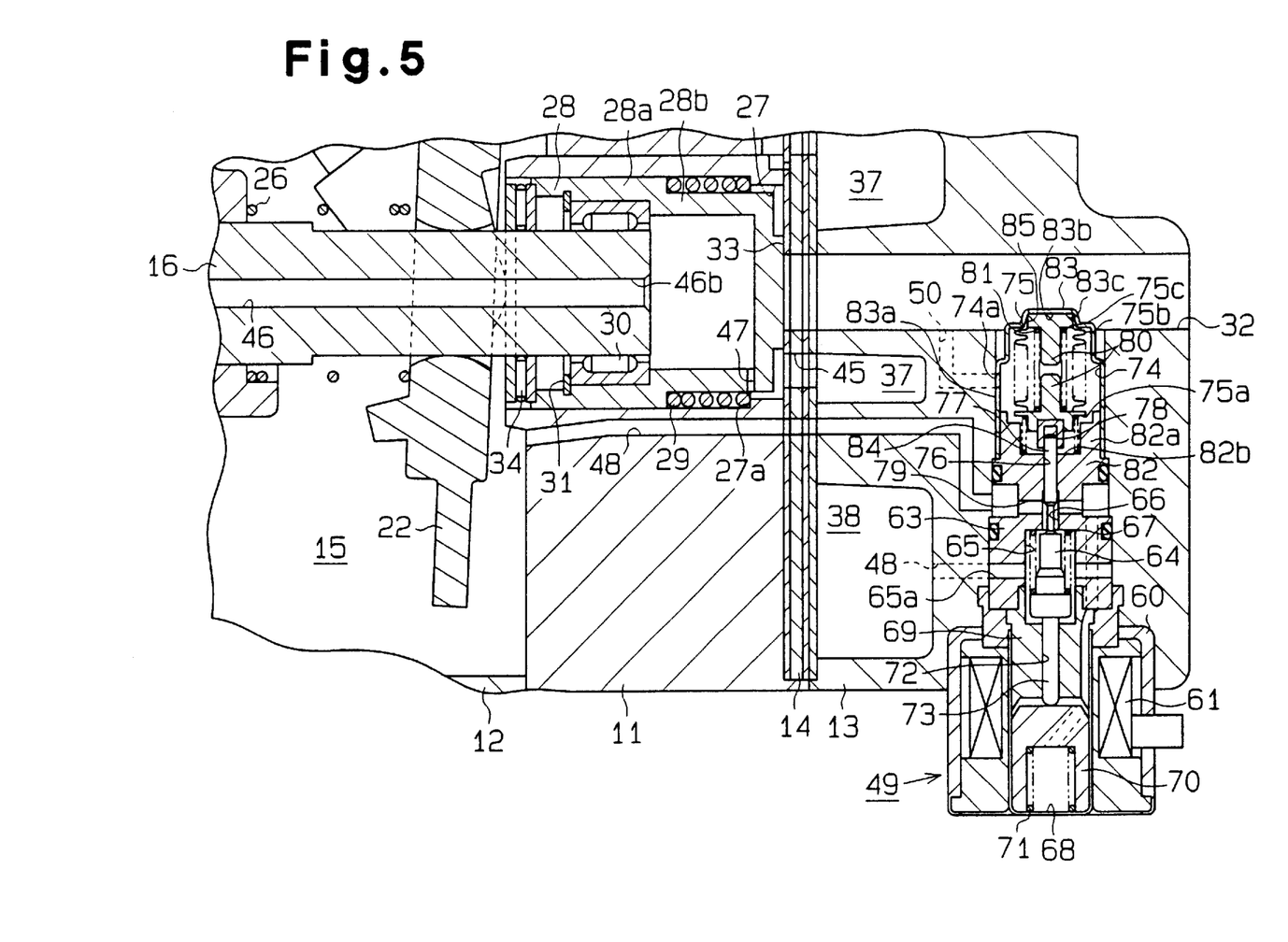
FIG. 5 is an enlarged partial cross-sectional view illustrating the compressor of FIG. 3 when the inclination of the swash plate is minimum.

As shown in FIGS. 3 to 5, the cylinder block 11 has a shutter chamber 27 at its center portion. The shutter chamber 27 extends along the axis of the drive shaft 16. A cup-shaped shutter 28 is slidably accommodated in the shutter chamber 27. The shutter 28 has a large diameter portion 28a and a small diameter portion 28b. A spring 29 is located between a step 27a formed in the shutter chamber 27 and a step, or a shoulder, which is formed between the large diameter portion 28a and the small diameter portion 28b. The coil spring 29 urges the shutter 28 in a direction to open a suction passage 32. The spring 29 urges the shutter 28 toward the swash plate 22.

The rear end of the drive shaft 16 is inserted in the shutter 28. A radial bearing 30 is fixed to the inner wall of the large diameter portion 28a by a snap ring 31. The rear end of the drive shaft 16 is slidably supported by the inner wall of the shutter chamber 27 with the radial bearing 30 and the shutter 28 in between.

The suction passage 32 is defined in the center of the rear housing 13 and the valve plate 14. The axis of the passage 32 is aligned with the axis of the drive shaft 16. The suction passage 32 communicates with the shutter chamber 27. A positioning surface 33 is formed on the valve plate 14 about the inner opening of the suction passage 32. The rear end of the shutter's small diameter portion 28b abuts against the positioning surface 33. The abutment limits rearward movement of the shutter 28.

A thrust bearing 34 is supported on the drive shaft 16 and is located between the swash plate 22 and the shutter 28. The thrust bearing 34 slides along the axis of the drive shaft 16. The force of the spring 29 constantly retains the thrust bearing 34 between the swash plate 22 and the large diameter portion 28a of the shutter 28.

When the swash plate 22 inclines toward the shutter 28, the movement of the swash plate 22 is transmitted to the shutter 28 through the thrust bearing 34. Accordingly, the shutter 28 moves toward the positioning surface 33 while contracting the spring 29. Consequently, the shutter 28 contacts the positioning surface 33. The thrust bearing 34 prevents rotation of the swash plate 22 from being transmitted to the shutter 28.

As shown in FIG. 3, the cylinder block 11 has cylinder bores 11a extending therethrough. Each cylinder bore 11a houses a single-headed piston 35. The rotating movement of the swash plate 22 is transmitted to each piston 35 through a pair of shoes 36 and is converted to linear reciprocation of the piston 35 in the associated cylinder bore 11a.

An annular suction chamber 37 and an annular discharge chamber 38 are defined in the rear housing 13. The valve plate 14 has suction ports 39 and discharge port 40. The valve plate 14 also has suction valve flaps 41 and discharge valve flaps 42. Each suction valve flap 41 corresponds to one of the suction ports 39 and each discharge valve flap 42 corresponds to one of the discharge ports 40. As each piston 35 moves from the top dead center to the bottom dead center in the associated cylinder bore 11a, refrigerant gas in the suction chamber 37 enters the cylinder bore 11a through the associated suction port 39 while causing the associated valve flap 41 to flex to an open position. As each piston 35 moves from the bottom dead center to the top dead center in the associated cylinder bore 11a, the gas in the cylinder bores 11a is compressed to a predetermined pressure. The gas is then discharged to the discharge chamber 38 through the associated discharge port 40 while causing the associated valve flap 42 to flex to an open position. The opening amount of each discharge valve flap 42 is defined by contact between the valve flap 42 and an associated retainer 43.

Gas compression in the cylinder bore 11 generates reactive force. The reactive force is transmitted to the lug plate 21 through the pistons 35, the shoes 36, the swash plate 22 and the guide pins 23. A thrust bearing 44, which is located between the front housing 12 and the lug plate 21, carries the reactive force transmitted to the lug plate 21.

As shown in FIGS. 3 to 5, the suction chamber 37 is connected with the shutter chamber 27 by a hole 45. When contacting the positioning surface 33, the shutter 28 closes the front opening of the suction passage 32 thereby disconnecting the hole 45 from the suction passage 32. The drive shaft 16 has an axial passage 46. The passage 46 has an inlet 46a and an outlet 46b. The inlet 46a opens to the crank chamber 15 in the vicinity of the lip seal 20 and the outlet 46b opens to the interior of the shutter 28. The interior of the shutter 28 is connected with the shutter chamber 27 by a pressure release hole 47, which is formed in the shutter wall near the rear end of the shutter 28.

The discharge chamber 38 is connected with the crank chamber 15 by a supply passage 48. The supply passage 48 is regulated by a displacement control valve 49, which is accommodated in the rear housing 13. The control valve 49 is connected with the suction passage 32 by a pressure introduction passage 50. The passage 50 introduces suction pressure Ps to the valve 49 from the suction passage 32.

An outlet 51 is formed in the cylinder block 11 and communicates with the discharge chamber 38. The outlet 51 is connected to the suction passage 32, which introduces refrigerant gas to the suction chamber 37, by the external refrigerant circuit 52. The outlet 51 discharges refrigerant gas in the discharge chamber 38 to an external refrigerant circuit 52. The refrigerant circuit 52 includes a condenser 53, an expansion valve 54 and an evaporator 55.

A temperature sensor 56 is located in the vicinity of the evaporator 55. The temperature sensor 56 detects the temperature of the evaporator 55 and issues signals relating to the detected temperature to a computer 57. The computer 57 is also connected to a temperature adjuster 58, a compartment temperature sensor 58a and an air conditioner starting switch 59. A passenger sets a desirable compartment temperature by the temperature adjuster 58.

The computer 57 receives various information including, for example, a target temperature set by the temperature adjuster 58, the temperature detected by the temperature sensor 56, the passenger compartment temperature detected by the temperature sensor 58a, an ON/OFF signal from the starting switch 59, the external temperature and the engine speed. Based on this information, the computer 57 computes the value of a current supplied to an electromagnetic actuator 60 of the displacement control valve 49 and transmits the computed current value to a driver 62. The driver 62 sends a current having the computed value to a solenoid coil 61 for actuating the actuator 60.

The electromagnetic valve 49 will now be described.

As shown in FIGS. 1 to 5, the control valve 49 includes a housing 63 and the electromagnetic actuator 60. The housing 63 and the actuator 60 are secured to each other at the center of the valve 49. A valve chamber 65 is defined between the actuator 60 and the housing 63. The valve chamber 65 accommodates a valve body 64. The housing 63 also has a valve hole 66 extending along its axis. The lower opening of the valve hole 66 faces the valve body 64. An opening spring 67 extends between the valve body 64 and a wall of the valve chamber 65. The spring 67 urges the valve body 64 away from the valve hole 66, or in a direction opening the valve hole 66. The valve chamber 65 is connected with the discharge chamber 38 by a port 65a and the supply passage 48.

Figure 1:
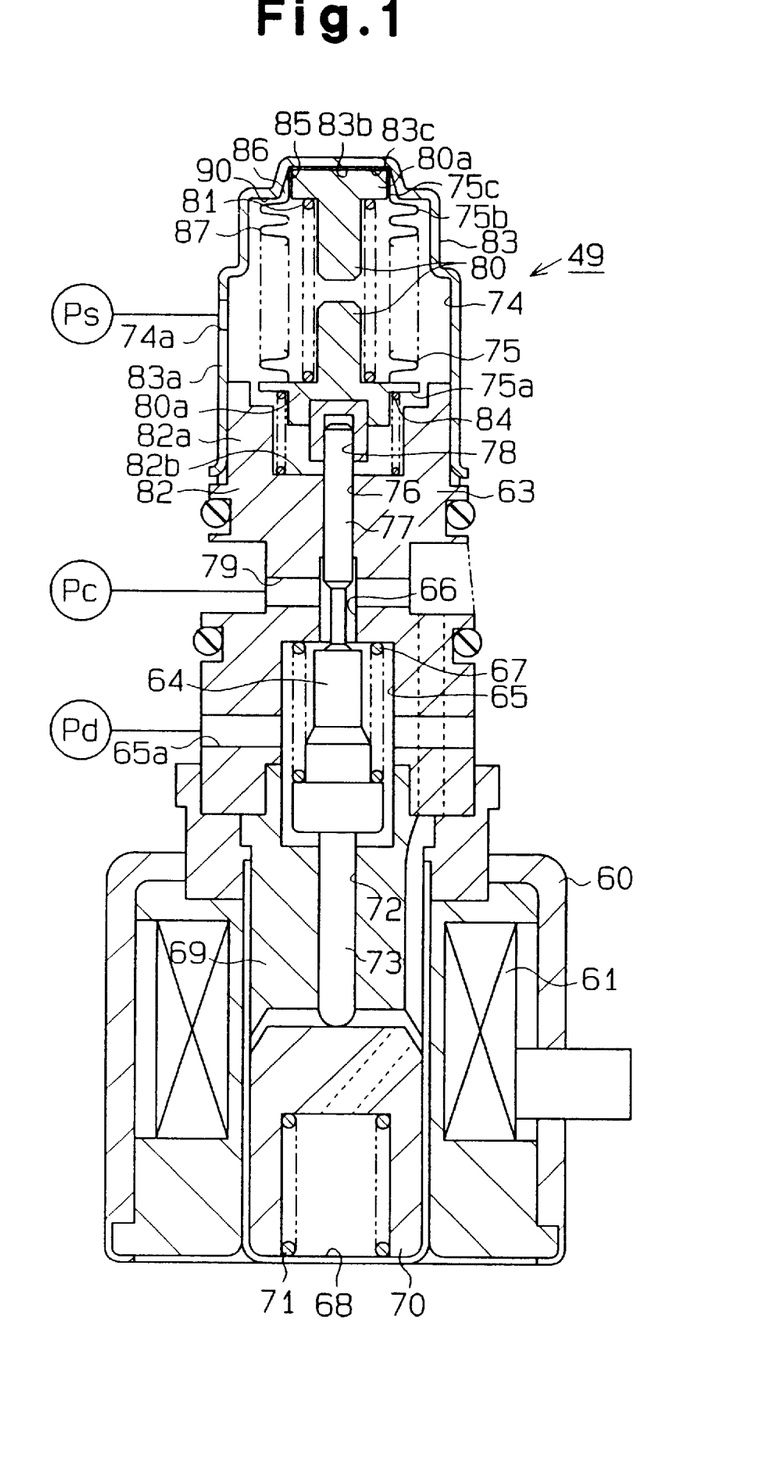
FIG. 1 is a cross-sectional view illustrating an electromagnetic valve according to a first embodiment of the present invention.

The actuator 60 includes a cylindrical casing 68 having a closed end. A fixed iron core 69 is fitted to the upper opening of the casing 68. The casing 68 accommodates a cylindrical iron plunger 70, which slides with respect to the casing 68.

The plunger 70 has the closed upper end. A follower spring 71 extends between the plunger 70 and the bottom of the casing 68. The urging force of the spring 71 is smaller than that of the spring 67.

The fixed core 69 has a first guide hole 72 extending between the interior of the casing 68 and the valve chamber 65. A first rod, or a solenoid rod 73, is formed integrally with the valve body 64 and projects downward from the bottom of the valve body 64. The rod 73 extends through and slides with respect to the first guide hole 72. The resultant forces of the springs 67 and 71 causes the lower end of the rod 73 to constantly contact the plunger 70. In other words, the valve body 64 moves integrally with the plunger 70 with the rod 73 in between.

The solenoid coil 61 is located about the fixed core 69 and the plunger 70. The driver 62 supplies the coil 61 with a current having a value computed by the computer 57.

A pressure sensing chamber 74 is defined in the upper portion of the housing 63. The sensing chamber 74 is connected with the suction passage 32 by a pressure introduction port 74a and the pressure introduction passage 50. A pressure sensing member 75 is housed in the sensing chamber 74. The sensing member 75 has a base 75a located at the lower end. A cap-shaped connector 78 is secured to the base 75a.

A second guide hole 76 is formed in the housing 63 to connect the sensing chamber 74 with the valve chamber 65. The second guide hole 76 slidably accommodates a second rod, or a pressure sensing rod 77. The top end of the sensing rod 77 is slidably inserted in the connector 78. The rod 77 couples the sensing member 75 and the valve body 64 such that the distance between the sensing member 75 and the valve body 64 is changeable. The rod 77 has a small diameter portion, which extends within the valve hole 66. The clearance between the small diameter portion and the valve hole 66 permits the flow of refrigerant gas.

A third port 79 is formed in the housing 63 between the valve chamber 65 and the pressure sensing chamber 74. The port 79 extends intersecting the valve hole 66 and is connected with the crank chamber 15 by the supply passage 48. Thus, the valve chamber port 65a, the valve chamber 65, the valve hole 66 and the port 79 constitute a part of the supply passage 48.

The pressure sensing member 75 further includes a bellows 75b and a thin metal cover 75c. The cover 75c is formed by pressing a metal plate and has a cylindrical shape with a closed upper end. The base 75a is fixed to the lower end of the bellows 75b. The cover 75c is fixed to the upper end of the bellows. The interior of the sensing member 75 is sealed by the base 75a and the cover 75c.

Figure 2:
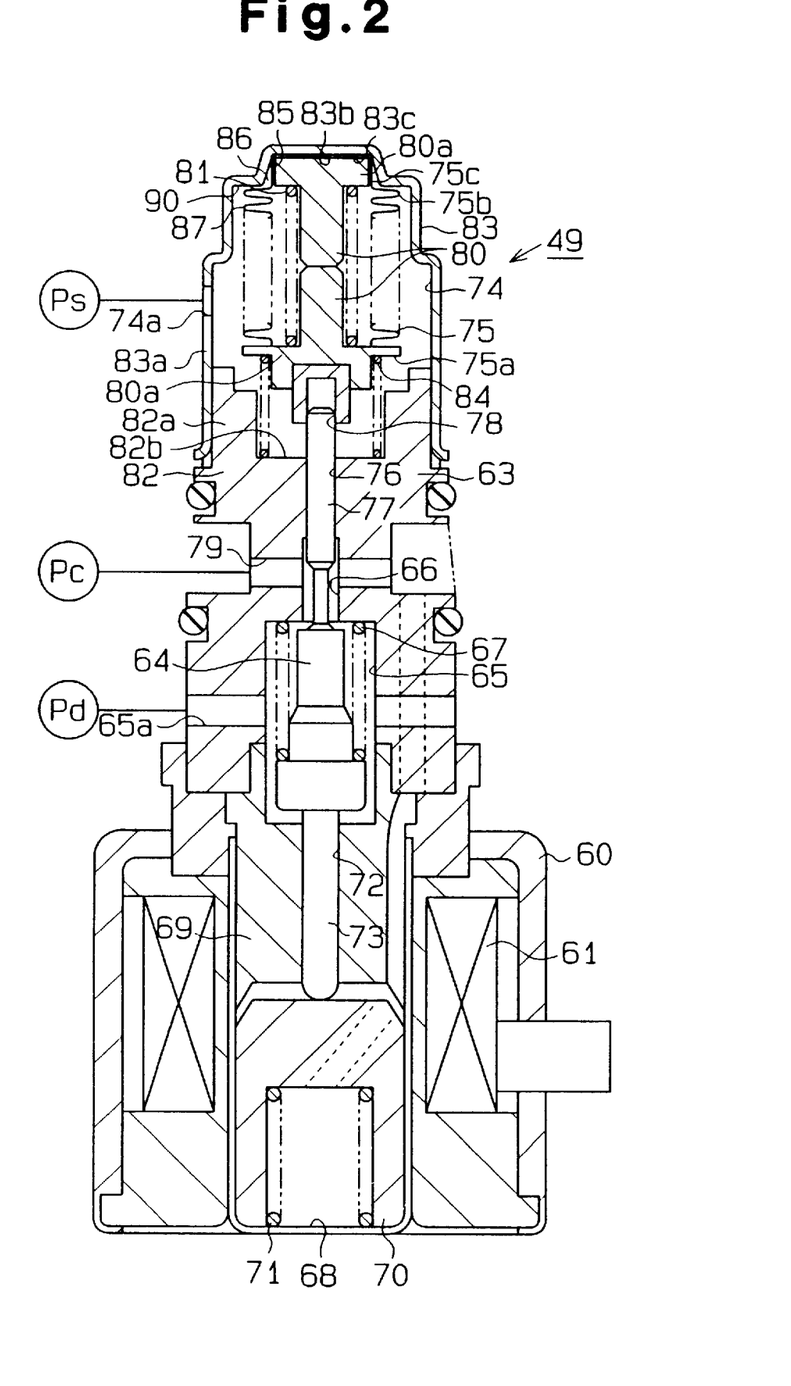
FIG. 2 is a cross-sectional view like FIG. 1 showing a contracted pressure sensing member.

A pair of stoppers 80 face each other in the sensing member 75. Each stopper 80 has a T-shaped cross-section and includes a flange 80a. The upper stopper 80 contacts the cover 75c and the lower stopper 80 is integrally formed with the base 75a. The cover 75c covers the upper portion of the upper stopper 80. As shown in FIG. 2, abutment of the stoppers 80 limits the collapse of the sensing member 75. A spring 81 extends between the flanges 80a of the stoppers 80. The spring 81 urges the stoppers 80 away from each other, or in a direction expanding the sensing member 75.

The housing 63 includes a housing body 82 and a cap 83. The lower end of the housing body 82 is coupled to the actuator 60. A cylindrical wall 82a extends from the top of the housing body 82. The wall 82a has a recess 82b.

The cap 83 is formed by pressing a metal plate and is fitted to the circumference of the cylindrical wall 82a. The initial position of the sensing member 75 in the axial direction is determined by the position of the cap 83 relative to the housing body 82. Also, the cap 83 and the housing body 82 defines the pressure sensing chamber 74 in between.

The cap 83 includes a cylinder 83a and a recess 83b. A space exists between the circumference of the sensing member 75 and the inner wall of the cylinder 83a. The recess 83b receives the cover 75c of the sensing member 75.

A compression spring 84 extends between the base 75a of the sensing member 75 and the recess 82b of the housing body 82. The spring 84 urges the sensing member 75 toward a bottom surface 83c of the cap 83. Accordingly, the axis of the sensing member 75 is generally kept aligned with the axis of the sensing rod 77.

The recess 83b has a side wall 85. The wall 85 is tapered such that it narrows the bottom surface 83c and functions as a guide. A first space 86 between the inner surface of the tapered wall 85 and the outer surface of the cover 75c is smaller (in the radial direction) than a second space 87 between the inner surface of the cylinder 83a and the outer surface of the bellows 75b.

The position of the cap 83 relative to the housing body 82 is determined such that the upper end of the cover 75c is always above a step 90, which is formed at the lower end of the tapered wall 85. When the sensing rod 77 is closest to the actuator 60 and the sensing member 75 is most contracted, the cover 75c is moved to its maximum distance from the bottom surface 83c if the sensing member 75 follows the movement of the rod 77 toward the actuator 60 against the force of the spring 84. However, even if the cover 75c is at its maximum distance from the bottom surface 83c, the upper end of the cover 75c is above the step 90.

The operation of the electromagnetic valve 49 and the compressor having the valve 49 will now be described.

When the air conditioner starting switch 59 is on, if the temperature detected by the compartment temperature sensor 58a is higher than a target temperature set by the temperature adjuster 58, the computer 57 commands the driver 62 to excite the actuator 60. Accordingly, the driver 62 actuates the solenoid coil 82 with electric current having a magnitude based on the difference between the compartment temperature and the target temperature. This produces a magnetic attractive force between the fixed core 69 and the plunger 70 in accordance with the current magnitude. The attractive force is transmitted to the valve body 64 by the solenoid rod 73 and thus urges the valve body 64 against the force of the spring 67 in a direction closing the valve hole 66.

On the other hand, the length of the sensing member 75 varies in accordance with the suction pressure Ps that is introduced to the pressure sensing chamber 74 via the pressure introduction passage 50. When the coil 61 is excited, the plunger 70 is moved upward by the attractive force between the fixed core 69 and the plunger 70. The plunger 70 moves the solenoid rod 73 and the valve body 64 away from the actuator 60. The sensing rod 77 is moved toward the sensing member 75, accordingly. When the upper end of the rod 77 contacts the top of the connector 78, the sensing member 75 is held between the rod 77 and the bottom surface 83c of the cap 83. Changes in the length of the sensing member 75 are transmitted to the valve body 64 by the rod 77. The opening area of the valve 49 is determined by the equilibrium position of the body 64, which is affected by the force of the actuator 60, the force of the sensing member 75 and the force of the spring 67.

When the cooling load is great, the temperature in the passenger compartment detected by the sensor 58a is higher than a target temperature set by the temperature adjuster 58. The computer 57 commands the driver 62 to increase the magnitude of the current sent to the coil 61 as the difference between the compartment temperature increases. A higher current magnitude increases the attractive force between the fixed core 69 and the plunger 70, thereby increasing the resultant force that causes the valve body 64 to close the valve hole 66.

Accordingly, the opening amount of the valve 49 is decreased. A smaller opening amount of the valve 49 represents a decreased refrigerant gas flow from the discharge chamber 38 to the crank chamber 15 via the supply passage 48. The refrigerant gas in the crank chamber 15 flows into the suction chamber 37 via the axial passage 46, the interior of the shutter 28, the pressure release hole 47, the shutter chamber 27 and the hole 45. This lowers the pressure Pc in the crank chamber 15.

Further, when the cooling load is great, the temperature of the evaporator 55 is high and the pressure of refrigerant gas that returns to the suction chamber 37 is high. Therefore, the pressure difference between the crank chamber 15 and the cylinder bores 11a is small. A smaller pressure difference between the crank and cylinder bores 15, 11a increases the inclination of the swash plate 22, thereby increasing the amount of refrigerant gas drawn into the cylinder bore 11a from the suction chamber 37. The compressor thus operates at a lower suction pressure Ps.

When the valve 49 completely closes the valve hole 66, no gas flows through the supply passage 48. In this state, highly pressurized refrigerant gas in the discharge chamber 38 is not supplied to the crank chamber 15. Therefore, the pressure Pc in the crank chamber 15 becomes substantially equal to the pressure Ps in the suction chamber 37. This maximizes the inclination of the swash plate 22, thereby causing the compressor to operate at the maximum displacement. The abutment of the swash plate 22 against the projection 21a of the lug plate 21 limits the maximum inclination of the swash plate 22.

When the cooling load is small, the difference between the compartment temperature detected by the sensor 58a and a target temperature set by the temperature adjuster 58 is small. In this state, the computer 57 commands the driver 62 to decrease the magnitude of the current sent to the coil 61. A lower current magnitude decreases the attractive force between the fixed core 76 and the plunger 70 and thus decreases the resultant force that moves the valve body 64 in a direction closing the valve hole 66.

Accordingly, the opening amount of the valve 49 is increased. A larger opening amount of the valve 49 represents an increased refrigerant gas flow from the discharge chamber 38 to the crank chamber 15 via the supply passage 48. Consequently, the amount of gas supplied to the crank chamber 15 exceeds the amount of gas flowing out from the crank chamber 15 to the suction chamber 37. This increases the pressure Pc in the crank chamber 15.

Further, when the cooling load is small, the temperature of the evaporator 55 is low and the pressure of refrigerant gas that returns to the suction chamber 37 is low. Therefore, the pressure difference between the crank chamber 15 and the cylinder bores 11a is great. A greater pressure difference between the crank and cylinder bores 15, 11a decreases the inclination of the swash plate 22 thereby decreasing the amount of refrigerant gas drawn into the cylinder bore 11a from the suction chamber 37. The compressor thus operates at a higher suction pressure Ps.

As the cooling load approaches zero, the temperature of the evaporator 55 drops to a frost forming temperature.

When the temperature sensor 56 detects a temperature that is equal to or lower than the temperature set by the temperature adjuster 58, the computer 57 commands the driver 62 to de-excite the actuator 60. The driver 62 stops sending current to the coil 61, accordingly. This stops the magnetic attractive force between the fixed core 69 and the plunger 70.

The valve body 64 is then moved by the force of the spring 67 downward (as viewed in the drawings) against the force of the spring 71. In other words, the valve body 66 is moved in a direction to open the valve hole 67. This maximizes the opening area between the valve body 64 and the valve hole 66. Accordingly, a great amount of highly pressurized gas in the discharge chamber 38 is supplied to the crank chamber 15 via the supply passage 48. This raises the pressure Pc in the crank chamber 15, thereby minimizing the inclination of the swash plate 22.

When the switch 59 is turned off, the computer 57 commands the driver 60 to de-excite the actuator 60. Accordingly, the inclination of the swash plate 22 is minimized.

As described above, the valve 49 is controlled in accordance with the magnitude of the current supplied to the coil 61 of the actuator 60. When the magnitude of the current is increased, the valve 49 opens valve hole 66 at a lower suction pressure Ps. When the magnitude of the current is decreased, on the other hand, the valve 49 opens the valve hole 66 at a higher suction pressure Ps. In this manner, the target value of the suction pressure Ps is changed in accordance with the magnitude of the current supplied to the coil 61. The inclination of the swash plate 22 is changed to maintain the target suction pressure Ps. Accordingly, the displacement of the compressor is varied.

Further, the valve 49 allows the compressor to operate at the minimum displacement at any given suction pressure Ps. The compressor, which is equipped with the control valve 49 having such functions, controls the refrigeration level of the refrigerant circuit.

When the inclination of the swash plate 22 is minimum as illustrated in FIG. 5, the shutter 28 abuts against the positioning surface 33. The abutment disconnects the suction passage 32 from the shutter chamber 27 thereby stopping the flow of refrigerant gas from the refrigerant circuit 52 to the suction chamber 37. The swash plate 22 moves the shutter 28 between a closed position for disconnecting the suction passage 32 from the shutter chamber 27 and an open position for connecting the passage 32 with the chamber 27.

The minimum inclination of the swash plate 22 is slightly more than zero degrees. Therefore, even if the inclination of the swash plate 22 is minimum, refrigerant gas in the cylinder bores 11*a* is discharged to the discharge chamber 38. The refrigerant gas in the discharge chamber 38 then enters the crank chamber 15 through the supply passage 48. The refrigerant gas in the crank chamber 15 is drawn back into the suction chamber 37 through the axial passage 46, the interior of the shutter 28 the pressure release hole 47, the shutter chamber 27 and the hole 45. The gas in the suction chamber 37 is drawn into the cylinder bores 11*a* and is again discharged to the discharge chamber 38.

That is, when the inclination of the swash plate 22 is minimum, refrigerant gas circulates within the compressor traveling through the discharge chamber 38, the supply passage 48, the crank chamber 15, the axial passage 46, the interior of the shutter 28, the pressure release hole 47, the shutter chamber 27, the hole 45, the suction chamber 37, which serves as a suction pressure area, and the cylinder bores 11*a* since the pressures in the discharge chamber 38, the crank chamber 15 and the suction chamber 37 are different. The circulation of refrigerant gas therefore allows lubricant oil contained in the gas to lubricate the moving parts of the compressor.

When the switch 59 is on and the inclination of the swash plate 22 is minimum, an increase in the compartment temperature increases the cooling load. In this case, if the temperature detected by the compartment temperature sensor 58*a* exceeds a target temperature set by the compartment temperature adjuster 58, the computer 57 commands the driver 62 to excite the actuator 60 based on the detected temperature increase. The actuator 60 closes the supply passage 48 with the valve body 64. The pressure Pc in the crank chamber 15 is released to the suction chamber 37 through the axial passage 46, the interior of the shutter 28, the pressure release hole 47, the shutter chamber 27 and the hole 45. This lowers the pressure Pc. Accordingly, the spring 29 expands from the state of FIG. 5. That is, spring 29 moves the shutter 28 away from the positioning surface 33 and increases inclination of the swash plate 22 from the minimum inclination.

As the shutter 28 is moved away from the positioning surface 33, the amount of refrigerant gas flow from the suction passage 32 into the suction chamber 37 is gradually increased. Therefore, the amount of refrigerant gas that enters the cylinder bores 11*a* from the suction chamber 37 is gradually increased. The displacement of the compressor and the discharge pressure Pd are gradually increased, accordingly. The gradual increase of the discharge pressure Pd gradually increases the torque for operating the compressor. In this manner, the torque of the compressor does not dramatically change in a short time when the displacement changes from the minimum to the maximum. This reduces the shock that accompanies load torque fluctuations.

If the engine is stopped, the compressor is also stopped, that is, the rotation of the swash plate 22 is stopped, and the supply of current to the coil 61 is stopped. Therefore, the actuator 60 is de-excited and opens the supply passage 48. If the nonoperational state of the compressor continues, the pressures in the chambers of the compressor equalize, and the swash plate 22 is kept at the minimum inclination by the force of spring 26. Therefore, when the engine is started again, the compressor starts operating with the swash plate 22 at the minimum inclination. This requires the minimum torque. The shock caused by starting the compressor is thus almost eliminated.

The embodiment of FIGS. 1–5 has the following advantages.

A compressing spring 84 is located between the base 75*a* of the pressure sensing member 75 and the inner wall of the pressure sensing chamber 74. The spring 84 presses the upper end of the sensing member 75 against the bottom surface 83*c* of the cap 83 despite the engagement between the rod 77 and the sensing member 75. The spring 84 thus maintains the orientation of the sensing member 75 thereby preventing the axis of the member 75 from tilting, or becoming misaligned, relative to the axis of the rod 77. Therefore, the sensing member 75 is not held between the rod 77 and the ceiling 83*c* with its axis inclined relative to the axis of the rod 77. Thus, the urging force of the sensing member 75 does not fluctuate significantly and is accurately transmitted to the valve body 64. This allows the valve 49 to accurately control the opening of the supply passage 48.

The sensing member 75 can be temporarily separated from the bottom surface 83*c* when a vibration having certain frequency and direction is transmitted to the valve 49. The vibration can also slightly tilt the sensing member 75 relative to the rod 77. However, the recess 83b has a tapered wall 85. When being moved toward the bottom surface 83c, the upper end of the sensing member 75 is guided by the wall 85. This automatically realigns the upper end and eliminates the temporal tilt of the sensing member 75.

Further, the upper end of the cover 75c is always kept above the step 90 by the force of the spring 84. In other words, the sensing member 75 is always engaged with the recess 83b. This engagement effectively prevents tilting of the sensing member's axis. Therefore, the orientation of the sensing member 75 is maintained even if the urging force of the spring 84 is relatively small. Specifically, the urging force of the spring 84 is sufficient if the urging force maintains the engagement of the sensing member 75 with the recess 83b. As a result, the sensitivity of the sensing member 75 to pressure changes in the sensing chamber 74 is further improved.

The first space 86 between the cover 75c and the guide 85 is smaller than the second space 87 between the bellows 75b and the cylinder 83a (in the radial direction). Therefore, when the sensing member 75 is inclined, the cover 75c contacts the wall 85 before the bellows 75b contacts the cylinder 83a. In other words, the bellows 75b is always kept away from the cylinder 83a and is not worn. This improves the life of the sensing member 75 thus extending the life of the valve 49.

The upper end of the sensing member 75 is always above the step 90 of the cap 83. This prevents the upper end of the member 75 from being stuck on the step 90. Thus, the member 75 is prevented from being held with its axis inclined.

The cover 75c and the cap 83 are both formed by pressing a metal plate. The cover 75c and the cap 83 are therefore easily and accurately manufactured. Thus, tilting of the sensing member 75 relative to the rod 77 is positively prevented.

The valve 49 is used as a control valve in a variable displacement valve in a vehicle air conditioner. In addition to the compressor, the vehicle has a number of sources of vibrations. The valve 49 is therefore vibrated fairly frequently. However, the construction of the valve 49 prevents the sensing member 75 from being tilted relative to the axis of the rod 77 despite the vibration and guarantees an accurate displacement control of the compressor. Therefore, the valve 49 is especially suitable for on-vehicle variable displacement compressor.

The valve 49 is used in the clutchless type compressor, the shaft 16 of which is always coupled to the vehicle engine. Even if refrigeration is not necessary, the compressor keeps operating at the minimum displacement. In the minimum displacement operation, the rod 77, the solenoid rod 73 and the valve body 64 are closest to the actuator 60. In this state, the actuator 60 applies virtually no force to the sensing member 75. Therefore, the upper end of the sensing member 75 is easily separated from the bottom surface 83c. However, the valve 49 prevents the sensing member 75 from being tilted relative to the axis of the rod 77. Therefore, the valve 49 accurately controls the displacement of clutchless type variable displacement compressors, which frequently vibrate.

A second embodiment of the present invention will now be described with reference to FIGS. 6 and 7. The differences from the first embodiment will mainly be discussed below. In this embodiment, the construction for preventing the sensing member 75 from tilting relative to the rod 77 is different from that of the first embodiment.

Figure 6:
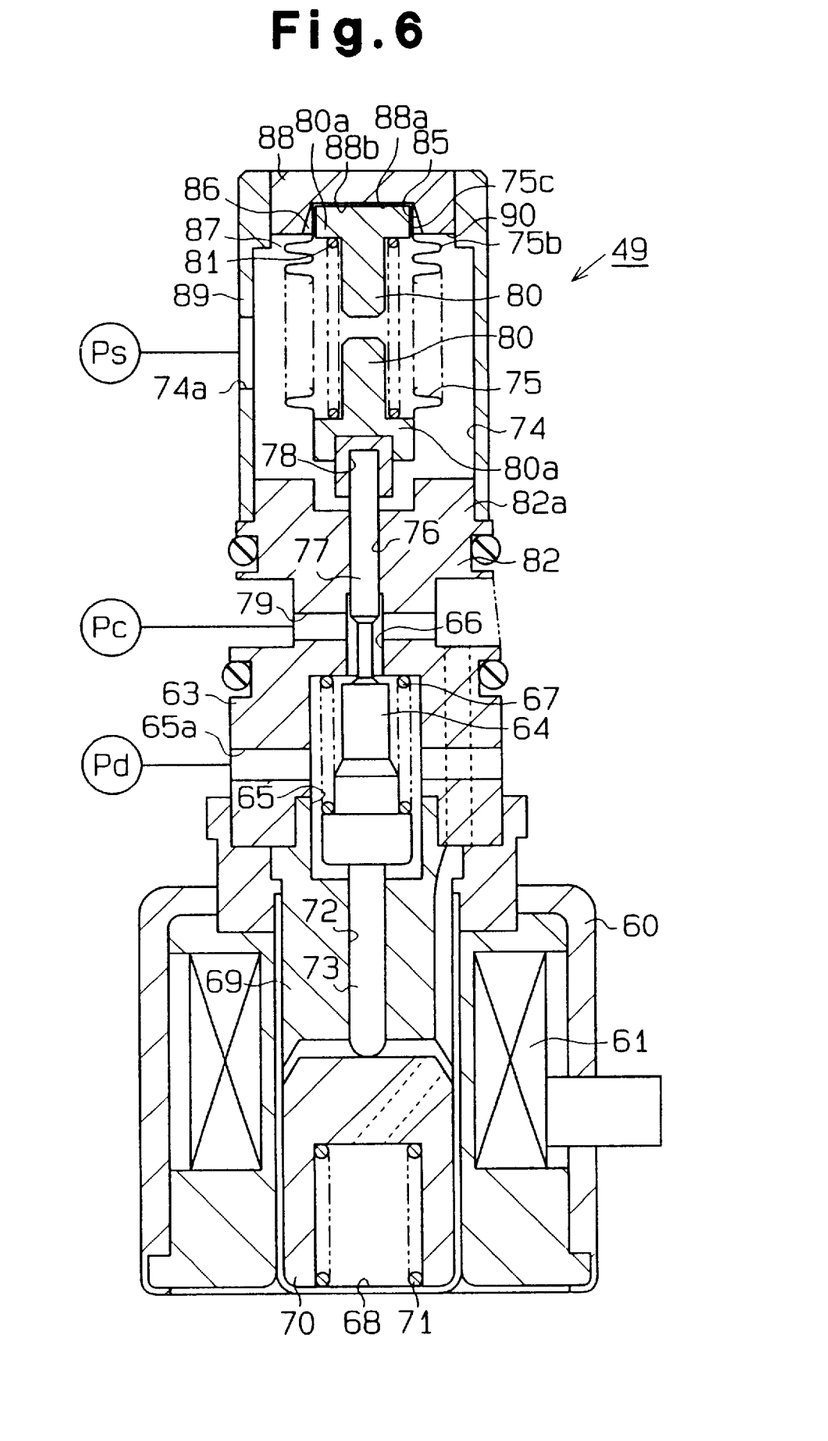
FIG. 6 is a cross-sectional view illustrating an electromagnetic valve according to a second embodiment of the present invention.

As shown in FIG. 6, in a control valve 49 according to the second embodiment, the upper end of a pressure sensing rod 77 is inserted in a connector 78 attached to the pressure sensing member 75. The connector 78 is crimped to the rod 77 with the axis of the rod 77 aligned with the axis of the sensing member 75.

A cylinder 89 is fitted to the circumference of the cylindrical wall 82a of the housing body 82. An inverted cup-shaped threaded lid 88 is screwed to the upper opening of the cylinder 89. The cylindrical wall 82a, the cylinder 89 and the lid 88 define a pressure sensing chamber 64. A recess 88a is formed in the inner surface of the lid 88. The recess 88a receives the cover 75c of the sensing member 75. The inner wall of the cylinder 89 constitutes a larger diameter portion of the sensing chamber 74. The side wall 85 of the recess 88a constitutes a smaller diameter portion of the sensing chamber 74. Further, the side wall 85 is tapered such that it narrows toward a bottom surface 88b of the recess 88a.

A step 90 is formed between the lid 88 and the cylinder 89. The position of the lid 88 is determined such that the upper end of the cover 75c stays above the step 90 when the upper end of the cover 75c is maximally spaced from the bottom surface 88b as illustrated in FIG. 7. The upper end of the cover 75c is farthest from the bottom surface 88b when the rod 77 is closest to the actuator 60 and the sensing member 75 is most contracted.

Figure 7:
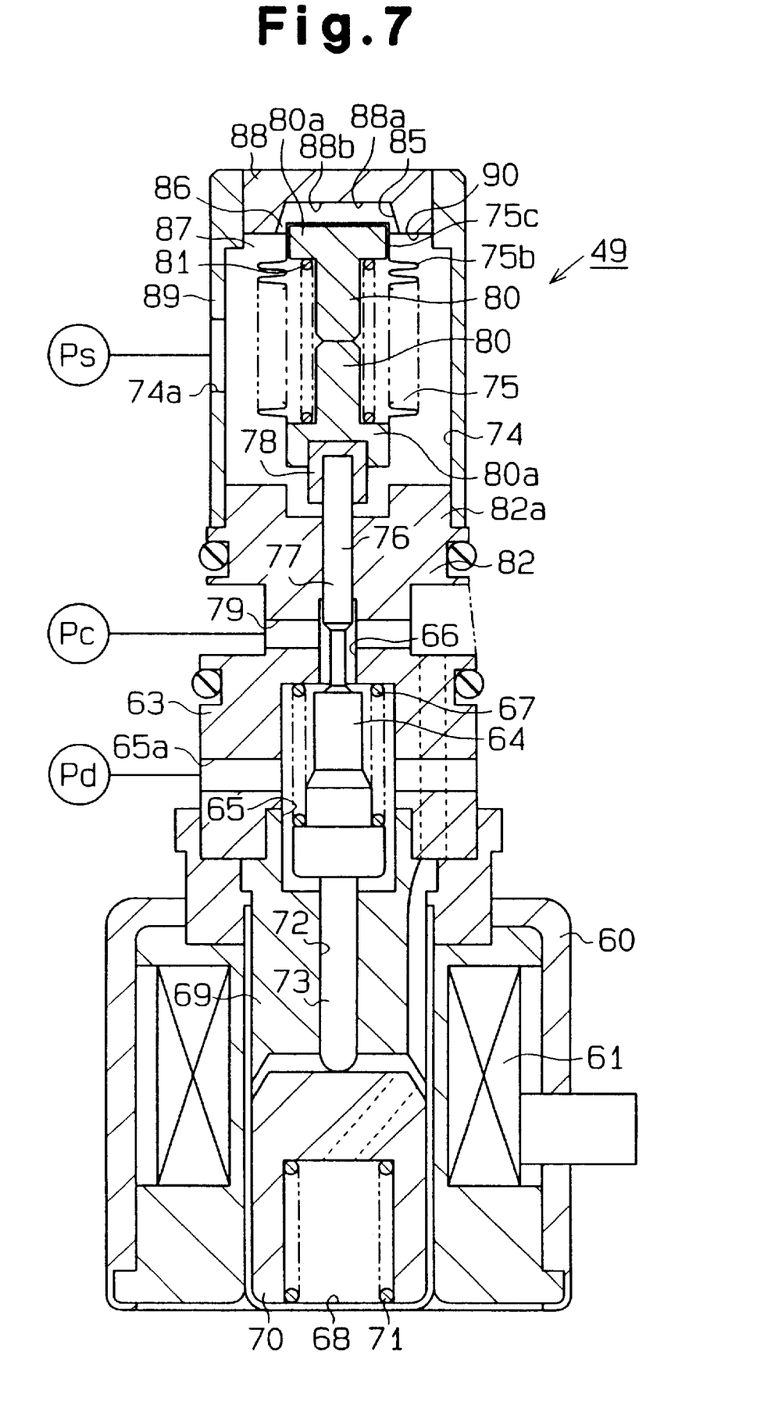
FIG. 7 is a cross-sectional view like FIG. 6 showing a different position of the pressure sensing member.

In addition to the advantages of the embodiment of FIGS. 1–5, the embodiment of FIGS. 6 and 7 has the following advantages.

The sensing member 75 is fixed to the rod 77. Therefore, tilting of the sensing member 75 relative to the rod 77 is prevented only by adjusting the orientation of the sensing member 75 when assembling the member 75 with the rod 77. Thus, force generated by expansion and contraction of the sensing member 75 is entirely transmitted to the valve body 64 through the rod 77. This allows the control valve 49 to accurately control its opening amount.

When being moved toward the bottom surface 88b, the upper end of the sensing member 75 is guided by the tapered wall 85. Further, the upper end of the sensing member 75 is always between the step 90 and the surface 88b. Therefore, the upper end of the sensing member 75 is automatically returned to a predetermined position without being stuck on the step 90. Thus, the member 75 is not held between the step 90 and the rod 77 with its axis misaligned.

The illustrated embodiments may be modified as follows:

Instead of forming the tapered wall 85, a cylindrical wall may be formed in the cap 83 and in the lid 88 for receiving the cover 75c of the sensing member 75.

The pressure sensing chamber 74 may be connected with the crank chamber 15 by the pressure introduction port 74a and the pressure introduction passage 50 for maintaining the pressure Pc in the crank chamber 15 at a substantially constant level.

The port 79 may be connected with the discharge chamber 38 by the upstream portion of the supply passage 48 for introducing the discharge pressure Pd into the valve hole 66. Also, the valve chamber port 65a may be connected with the crank chamber 15 by the downstream portion of the supply passage 48 for introducing the crank chamber pressure Pc into the valve chamber 65.

The compressors of the illustrated embodiments may have a bleeding passage that connects the crank chamber 15 with the suction chamber 37, and the control valve 49 may be located in the bleeding passage. In this case, the control valve 49 in the supply passage 48 may be omitted.

The valve 49 may be used in a compressor having a pressure control chamber that is independent from the crank chamber 15. In this case, one end of the supply passage 48 communicates with the pressure control chamber. The control valve 49 changes the pressure in the control chamber thereby changing the difference between the crank chamber pressure Pc and the pressure in the cylinder bores 11a. Accordingly, the inclination of the swash plate 22 is altered.

The valve 49 may be used in fluid machinery other than on-vehicle clutchless type variable displacement compressors. For example, the valve 49 may be used as a control valve in an air compressor, an air pump or a hydraulic pump.

What is claimed is:

1. A control valve that controls flow of fluid between a first passage and a second passage by selectively connecting and disconnecting the first passage and the second passage, the valve comprising:

a valve housing;

a valve chamber having a valve hole connected with the first passage and the second passage;

a valve body accommodated in the valve chamber for selectively closing and opening the valve hole;

a first spring for urging the valve body in a direction opening the valve hole;

an actuator for generating force in a direction closing the valve hole;

a first rod for transmitting the force of the actuator to the valve body;

a sensing chamber defined in the valve housing independently from the valve chamber to receive fluid from outside of the control valve;

a pressure sensing member located in the sensing chamber for sensing the pressure in the sensing chamber, said pressure sensing member having a peripheral wall;

a second rod for transmitting the pressure sensed by the pressure sensing member to the valve body; and means for maintaining a predetermined orientation of the pressure sensing member and preventing the peripheral wall of the pressure sensing member from contacting the valve housing, wherein the valve body is moved based on the fluid pressure sensed by the pressure sensing member, the force of the first spring and on the force of the actuator.

2. The control valve according to claim 1, wherein the valve housing comprises a housing body and a cap, and the sensing chamber is defined between the housing body and the cap, and wherein the sensing chamber is bounded by a first wall that is part of the housing body and a second wall that is part of the cap.

3. The control valve according to claim 2, wherein the pressure sensing member comprises:

a first stopper having a protrusion, wherein the first stopper is located in the vicinity of the first wall of the sensing chamber;

a second stopper having a protrusion that faces the first stopper;

a cover covering the upper portion of the second stopper and being located in the vicinity of the second wall of the sensing chamber;

a bellows attached to the first stopper and to the cover to surround the first stopper protrusion and the second stopper;

a second spring for urging the first stopper and the second stopper away from each other, wherein the force of the second spring acts in a direction opposite to the force of fluid pressure in the sensing chamber; and wherein the orientation maintaining means includes a third spring for urging the pressure sensing member toward the first wall of the sensing chamber.

4. The control valve according to claim 3, wherein the orientation maintaining means includes a recess formed in the first wall of the sensing chamber, wherein the recess includes a bottom and a side wall, and wherein the diameter of the side wall decreases toward the bottom.

5. The control valve according to claim 3, wherein the actuator comprises:

an iron core fixed to the valve housing;

a coil housing attached to the fixed core;

a solenoid coil located in the coil housing to surround the fixed core, wherein excitement of the solenoid coil produces electromagnetic force in the solenoid coil;

a movable iron core movably housed in the coil housing, wherein the electromagnetic force moves the movable core toward the fixed core, and wherein the movement of the movable core is transmitted to the valve body through the first rod; and a fourth spring for urging the movable core in a direction engaging with the first rod.

6. The control valve according to claim 5, wherein the first rod is movably supported by the fixed core, and wherein the second rod is movably supported by the valve housing.

7. The control valve according to claim 6, wherein the first rod and the second rod are located substantially on the same axis.

8. The control valve according to claim 6, wherein the second rod is integrally formed with the valve body.

9. The control valve according to claim 6, wherein the second rod includes a small diameter portion contacting the valve body and a large diameter portion coupled to a base of the pressure sensing member.

10. The control valve according to claim 9, wherein the base of the pressure sensing member includes a guide hole extending along the axis of the second rod, and wherein the large diameter portion of the second rod is movably inserted in the guide hole.

11. The control valve according to claim 9, wherein the second rod is secured to the base of the pressure sensing member.

12. The control valve according to claim 5, wherein the urging force of the fourth spring is smaller than the urging force of the first spring.

13. The control valve according to claim 4, wherein the pressure sensing member contracts as the pressure in the sensing chamber increases, and wherein the cover is located in the recess when the pressure sensing member contracts to its maximum degree.

14. A compressor comprising a housing including a suction chamber, a discharge chamber and a crank chamber, a rotary shaft supported by the housing, a rotor rotating integrally with the rotary shaft in the crank chamber, a cam plate tiltably supported on the rotary shaft in the crank chamber, a hinge mechanism for coupling the rotor with the cam plate, a cylinder bore defined in the housing, a piston reciprocally housed in the cylinder bore, wherein the rotation of the rotary shaft is converted into reciprocation of the piston by the rotor, the hinge mechanism and the cam plate, wherein the reciprocation of the piston draws refrigerant into the cylinder bore through the suction chamber, and wherein refrigerant is compressed in the cylinder bore and is discharged to the discharge chamber, the compressor further comprising:

a suction passage defined in the housing to introduce refrigerant into the suction chamber from the outside;

a shutter moving in accordance with inclination of the cam plate to open and to close the suction passage;

a supply passage connecting the crank chamber with the discharge chamber;

a control valve for opening and closing the supply passage, and wherein the control valve comprises:

a valve housing;

a valve chamber having a valve hole constituting a part of the supply passage;

a valve body accommodated in the valve chamber for selectively closing and opening the valve hole;

a first spring for urging the valve body in a direction opening the valve hole;

an actuator for generating force in a direction closing the valve hole;

a first rod for transmitting the force of the actuator to the valve body;

a sensing chamber defined in the valve housing independently from the valve chamber to receive refrigerant from the suction passage;

a pressure sensing member located in the sensing chamber for sensing the pressure in the sensing chamber, said pressure sensing member having a peripheral wall;

a second rod for transmitting the pressure sensed by the pressure sensing member to the valve body; and means for maintaining a predetermined orientation of the pressure sensing member and preventing the peripheral wall of the pressure sensing member from contacting the valve housing, wherein the valve body is moved based on the refrigerant pressure sensed by the pressure sensing member, the force of the first spring and on the force of the actuator.

15. The compressor according to claim 14, wherein the valve housing comprises a housing body and a cap, and the sensing chamber is defined between the housing body and the cap, and wherein the sensing chamber is bounded by a first wall that is part of the housing body and a second wall that is part of the cap.

16. The compressor according to claim 15, wherein the pressure sensing member comprises:

a first stopper having a protrusion, wherein the first stopper is located in the vicinity of the first wall of the sensing chamber;

a second stopper having a protrusion that faces the first stopper;

a cover covering the upper portion of the second stopper and being located in the vicinity of the second wall of the sensing chamber;

a bellows attached to the first stopper and to the cover to surround the first stopper protrusion and the second stopper;

a second spring for urging the first stopper and the second stopper away from each other, wherein the force of the second spring acts in a direction opposite to the force of refrigerant pressure in the sensing chamber; and wherein the orientation maintaining means includes a third spring for urging the pressure sensing member toward the first wall of the sensing chamber.

17. The compressor according to claim 16, wherein the orientation maintaining means includes a recess formed in the first wall of the sensing chamber, wherein the recess includes a bottom and a side wall, and wherein the diameter of the side wall decreases toward the bottom.

18. The compressor according to claim 16, wherein the actuator comprises:

an iron core fixed to the valve housing;

a coil housing attached to the fixed core;

a solenoid coil located in the coil housing to surround the fixed core, wherein excitement of the solenoid coil produces electromagnetic force in the solenoid coil;

a movable iron core movably housed in the coil housing, wherein the electromagnetic force moves the movable core toward the fixed core, and wherein the movement of the movable core is transmitted to the valve body through the first rod; and a fourth spring for urging the movable core in a direction engaging with the first rod.

19. The compressor according to claim 18, wherein the first rod is movably supported by the fixed core, and wherein the second rod is movably supported by the valve housing.

20. The compressor according to claim 19, wherein the first rod and the second rod are located substantially on the same axis.

21. The compressor according to claim 19, wherein the second rod is integrally formed with the valve body.

22. The compressor according to claim 19, wherein the second rod includes a small diameter portion contacting the valve body and a large diameter portion coupled to a base of the pressure sensing member.

23. The compressor according to claim 22, wherein the base of the pressure sensing member includes a guide hole extending along the axis of the second rod, and wherein the large diameter portion of the second rod is movably inserted in the guide hole.

24. The compressor according to claim 22, wherein the second rod is secured to the base of the pressure sensing member.

25. The compressor according to claim 18, wherein the urging force of the fourth spring is smaller than the urging force of the first spring.

26. The compressor according to claim 17, wherein the pressure sensing member contracts as the pressure in the sensing chamber increases, and wherein the cover is located in the recess when the pressure sensing member contracts to its maximum degree.

27. A control valve that controls flow of fluid between a first passage and a second passage by selectively connecting and disconnecting the first passage and the second passage, the valve comprising:

a valve housing;

a guide formed by a side wall of the housing;

a valve chamber having a valve hole connected with the first passage and the second passage;

a valve body accommodated in the valve chamber for selectively closing and opening the valve hole;

a first spring for urging the valve body in a direction opening the valve hole;

an actuator for generating force in a direction closing the valve hole;

a first rod for transmitting the force of the actuator to the valve body;

a sensing chamber having a base located at the lower end of the sensing chamber, the sensing chamber defined in the valve housing independently from the valve chamber to receive fluid from outside of the control valve;

a pressure sensing member located in the sensing chamber for sensing the pressure in the sensing chamber, said pressuring sensing member having a peripheral wall, at least one bellows and cover, the sensing chamber base fixed to a lower end of the bellows and the cover fixed to an upper end of the bellows;

a second rod for transmitting the pressure sensed by the pressure sensing member to the valve body; and a support structure having a first space between the cover and the guide and a second space between the bellows and a cylindrical side wall portion of the housing surrounding the bellows, the first space being smaller than the second space thereby causing the pressure sensing member to axially align with the second rod and preventing the peripheral wall of the pressure sensing member from contacting the valve housing, wherein the valve body is moved based on the fluid pressure sensed by the pressure sensing member, the force of the first spring and on the force of the actuator.

28. A control valve that controls flow of fluid between a first passage and a second passage by selectively connecting and disconnecting the first passage and the second passage, the valve comprising:

a valve housing;

a valve chamber having a valve hole connected with the first passage and the second passage;

a valve body accommodated in the valve chamber for selectively closing and opening the valve hole;

a sensing chamber defined in the valve housing independently from the valve chamber to receive fluid from outside of the control valve;

a pressure sensing member located in the sensing chamber for sensing the pressure in the sensing chamber, said pressure sensing member having a peripheral wall;

a pressure sensing rod for transmitting the pressure sensed by the pressure sensing member to the valve body; and means for maintaining a predetermined orientation of the pressure sensing member and preventing the peripheral wall of the pressure sensing member from contacting the valve housing.

29. The control valve according to claim 28, wherein the valve housing comprises a housing body and a cap, and the sensing chamber is defined between the housing body and the cap, and wherein the sensing chamber is bounded by a first wall that is part of the housing body and a second wall that is part of the cap.

30. The control valve according to claim 29, wherein the pressure sensing member comprises:

a first stopper having a protrusion, wherein the first stopper is located in the vicinity of the first wall of the sensing chamber;

a second stopper having a protrusion that faces the first stopper;

a cover covering the upper portion of the second stopper and being located in the vicinity of the second wall of the sensing chamber;

a bellows attached to the first stopper and to the cover to surround the first stopper protrusion and the second stopper;

a first spring for urging the first stopper and the second stopper away from each other, wherein the force of the first spring acts in a direction opposite to the force of fluid pressure in sensing chamber; and wherein the orientation maintaining means includes a second spring for urging the pressure sensing member toward the first wall of the sensing chamber.

31. The control valve according to claim 30, wherein the orientation maintaining means includes a recess formed in the first wall of the sensing chamber, wherein the recess includes a bottom and a side wall, and wherein the diameter of the side wall decreases toward the bottom.

32. The control valve according to claim 31, wherein the pressure sensing member includes a guide hole extending along the axis of the pressure sensing rod, and the second rod, and wherein the large diameter portion of the pressure sensing rod is movably inserted in the guide hole.

33. The control valve according to claim 30, wherein the pressure sensing member contracts as the pressure in the sensing chamber increases, and wherein the cover is located in the recess when the pressure sensing member contracts to its maximum degree.

34. The control valve according to claim 28, further comprising:

a spring for urging the valve body in a direction opening the valve hole;

an actuator for generating force in a direction closing the valve hole; and a solenoid rod for transmitting the force of the actuator to the valve body.

35. The control valve according to claim 34, wherein the actuator comprises:

an iron core fixed to the valve housing;

a coil housing attached to the fixed core;

a solenoid coil located in the coil housing to surround the fixed core, wherein excitement of the solenoid coil produces electromagnetic force in the solenoid coil; and a movable iron core movably housed in the coil housing, wherein the electromagnetic force moves the movable core toward the fixed core, and wherein the movement of the movable core is transmitted to the valve body through the solenoid rod.

36. The control valve according to claim 35, wherein the solenoid rod is movably supported by the fixed core, and wherein the pressure sensing rod is movably supported by the valve housing.

37. The control valve according the claim 34, wherein the solenoid rod and the pressure sensing rod are located substantially on the same axis.

38. The control valve according to claim 34, wherein the pressure sensing rod is integrally formed with the valve body.

39. The control valve according to claim 28, wherein the pressure sensing rod is secured to the pressure sensing member.

* * * * *